Patented Jan. 21, 1930

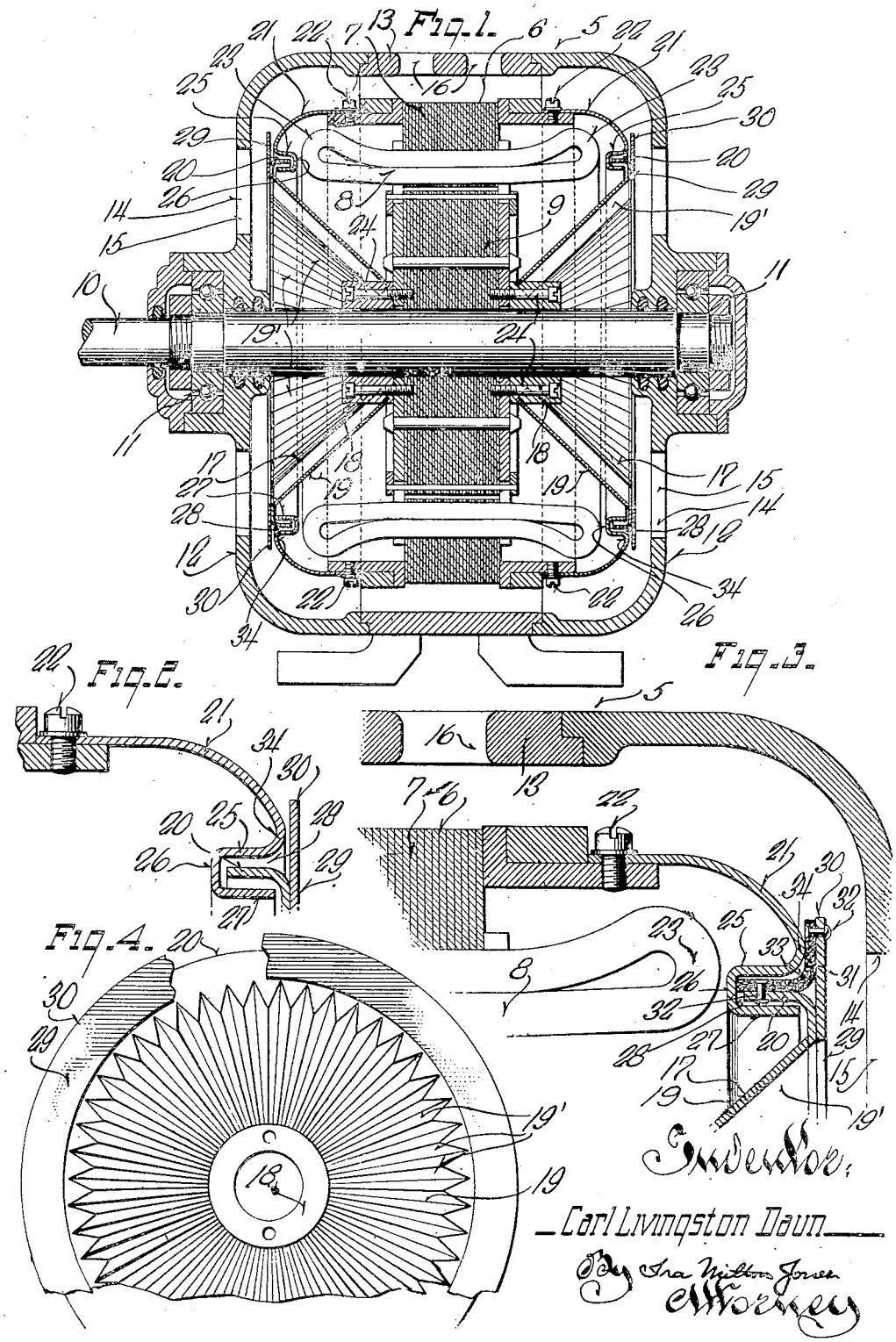

1,744,263

UNITED STATES PATENT OFFICE

CARL LIVINGSTON DAUN, OF MILWAUKEE, WISCONSIN, ASSIGNOR TO SILCOCK AIRADI-ATOR CORP., OF MILWAUKEE, WISCONSIN, A CORPORATION OF WISCONSIN

ELECTRIC MOTOR AND DYNAMO MACHINE

Application filed May 18, 1928. Serial No. 278,872.

This invention relates to certain new and useful improvements in electric motors and dynamo machines and is a continuation in part of my Patent Number 1,677,433.

In addition to the objects outlined in the above-mentioned applications, it is a further object of this invention to provide improved means for positively excluding extraneous matter from the live parts of the machine.

A more specific object of this invention resides in the provision of an improved machine of the character described in which the runner or rotating member has an inwardly extended annular flange traveling within an annular groove in a stationary sleeve or shield member and a vertical annular flange extending beyond the annular groove to form a positive seal against the entrance of extraneous matter into the live parts of the machine between the runner or rotating member and the stationary cooperating member.

And a still further object of this invention resides in the provision of an improved device of the character described having a fume tight joint between the runner and stationary member.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing, I have illustrated two complete examples of the physical embodiment of my invention constructed according to the best modes I have so far devised for the practical application of the principles thereof, and in which:

Figure 1 is a longitudinal, sectional view, with parts in elevation, taken through an electric motor and dynamo machine equipped with my invention;

Figure 2 is an enlarged, fragmentary, sectional view, taken transversely through the stationary sleeve or shield and the cooperating runner or rotary member;

Figure 3 is an enlarged, fragmentary view of one portion of an electric motor and dynamo machine illustrating a slightly modified form of my invention; and Figure 4 is a front plan view of the runner and rotary enclosing member with parts broken away and illustrating structural details.

Referring now more particularly to the accompanying drawing, in which like numerals designate like parts throughout the several views, 5 designates an electric motor and dynamo machine of any conventional design and construction having a stator 6 including a core 7 provided with windings 8 and a rotor 9 fixed to a shaft 10 journaled in the bearings 11 of end frame members 12 which, with a central frame unit 13, confine and hold the parts together. In conventional open type electric motors and dynamo machines, the heat generated by the motor when in operation is carried off by air entering spaces 14 between the spider arms 15 supporting the bearings, the air being expelled through outlets 16 in the frame unit 13.

Frequently, air impellers of any conventional design rotate with the shaft 10 to increase the velocity of the cooling air passing through the machine and in the application of my improved device, the air impellers are removed and replaced by runners or members 17 of novel design, enclosing the live parts of the machine at each end, as will be later described. Each member 17 consists of a hub portion 18 and a radially fluted or pleated, approximately disc shaped member 19 in the central aperture of which the hub portion is suitably secured. The periphery of member 17 has an annular flange 20 extended inwardly to cooperate with a sleeve or cylinder member 21 secured to the stator or frame, as at 22, and extended over the outermost ends of the end coils 23 of the windings 8.

The members 17 are preferably secured to the rotor by cap screws or other means 24 passed through the hubs 18 and threaded in the rotor, and are of substantially conical shape to extend inwardly of the plane of the outer ends of the coils 23 to be in close thermal contact with the live parts of the machine so that the heat generated thereby is readily thermally conducted through the members.

The sleeves 21 and the members 17 are preferably constructed of metal having a relatively high degree of thermal conductivity and the flanges 20 are soldered, brazed or otherwise secured to the outer periphery of the fluted members 19, the hubs 18 being cast, brazed or otherwise secured thereto thus forming a very rigid construction.

The pleats or flutes provide a series of radial channels 19' which draw the air thereto at their center portions impelling the same outwardly at high velocity to be discharged over the entire periphery of the runner. The pleats or flutes further provide large internal and external surface areas to assure a maximum of cooling surface within a minimum diameter and as the members are in close proximity to the source of heat, the air contacting therewith and passing thereover efficiently dissipates the heat generated by the machine and thermally conducted through the members.

The outer marginal edge of each sleeve 21 is preferably struck rearwardly, as at 25, inwardly, as at 26, and forwardly parallel to but slightly spaced from the wall 25, as at 27, to provide an annular channel or trap 28 in which the flange 20 runs with the necessary clearance, but at the same time excluding all dirt and other extraneous matter in the surrounding atmosphere from entering the live parts of the machine between the runners and sleeves. All extraneous matter entering the spaces 14 is discharged from the peripheries of the members 17 over the sleeves 21 and out through the openings 16. To provide further protection against dirt working past the trap formed by the flange 20 and the trough or groove 28, an annular ring or flange 29 is secured to the front face of each member 17 with its peripheral edge portion 30 extended beyond the trap or channel 28 so that any extraneous matter coming into contact with the member 17 is safely guided past the trap or channel and out of the motor housing through the outlets 16.

In Figure 3, a slightly modified form of my invention is illustrated in which a fume tight seal is provided between each runner and sleeve by a felt or other packing member 31 which, in the present embodiment, extends about the flanges 20 and 30 being secured thereto, as at 32, with its middle portion 33 substantially free to flex under centrifugal force and engage the rounding portion 34 of the sleeve 21 adjacent the annular trough 28. The member 31 is preferably saturated with a suitable oil to provide lubrication and as the runner rotates the loose portion 33 is thrown against the sleeve 21 by centrifugal force and provides a fume type joint to exclude all fumes of any character from the interior of the machine.

From the foregoing description taken in connection with the accompanying drawing, it will be readily apparent to those skilled in the art to which an invention of the character described appertains, that I provide a highly improved and novel eletric motor and dynamo machine which is fully enclosed and which has the same horse-power rating per pound as motors of the open type and further that I provide improved means whereby any open type electric motor and dynamo machine may be readily converted into a fully enclosed type without in any way impairing its efficiency.

What I claim as my invention is:

1. In an electric motor and dynamo machine including a rotor and a stator, a stationary member having an annular trough in its outer face portion, an imperforate fluted member, the flutes of said member forming internal and external surface irregularities to provide relatively large internal and external cooling areas; an annular flange carried by the fluted member adjacent its periphery and extended into said annular trough to, with the stationary member, substantially enclose the live parts of the machine, and a second peripheral flange carried by the fluted member and of a diameter greater than the largest diameter of said trough.

2. In an electric motor and dynamo machine including a rotor and a stator, a stationary member having an annular trough in its outer face portion, an imperforate fluted member, the flutes of said member forming internal and external surface irregularities to provide relatively large internal and external cooling areas, an annular flange member carried by the fluted member adjacent its periphery and extended into said annular trough to, with the stationary member, substantially enclose the live parts of the machine, a second peripheral flange carried by the fluted member and of a diameter greater than the largest diameter of said trough, and a fume excluding means cooperating with said stationary member and fluted member to exclude fumes from entering the live parts of the machine.

3. In an electric motor and dynamo machine including a rotor and a stator having windings, the ends of which project beyond the rotor, a stationary sleeve extended over the ends of the windings and having an annular channel concentric with respect to the rotor, a fluted member rotatable with the rotor, the flutes of said member forming internal and external surface irregularities to provide relatively large internal and external cooling areas, an annular flange carried by the fluted member and extended into the channel of the stationary sleeve whereby said sleeve and rotatable member substantially enclose the live parts of the machine, and a second flange carried by the rotatable member and overlapping the sleeve externally of its annular channel whereby extraneous matter striking the rotatable member is discharged therefrom over the stationary sleeve being guided in its passage over the channel by said second flange.

4. In an electric motor and dynamo machine including a rotor and a stator having windings, the ends of which project beyond the rotor, a stationary sleeve extended partly over the ends of the windings and having an annular channel concentric with respect to the rotor, a fluted member rotatable with the rotor, the flutes of said member forming internal and external surface irregularities to provide relatively large internal and external cooling areas, an annular flange carried by the fluted member and extended into the annular channel of the stationary sleeve whereby said sleeve and rotatable member substantially enclose the live parts of the machine, a second flange carried by the rotatable member and overlapping the sleeve externally of its annular channel whereby extraneous matter striking the rotatable member is discharged therefrom over the stationary member being guided in its passage over the channel by said flange, and a packing member disposed at the juncture between the stationary sleeve and rotary member.

5. In an electric motor and dynamo machine including a rotor and a stator having windings, the ends of which project beyond the rotor, a stationary sleeve extended over the ends of the windings and having an annular channel concentric with respect to the rotor, a fluted member rotatable with the rotor, the flutes of said member forming internal and external surface irregularities to provide relatively large internal and external cooling areas, an annular flange carried by the fluted member and extended into the annular channel of the stationary sleeve whereby said sleeve and rotatable member substantially enclose the live parts of the machine, a second flange carried by the rotatable member and overlapping the sleeve member externally of its channel whereby extraneous matter striking the rotatable member is discharged therefrom over the sleeve being guided in its passage over the channel by said second flange, and a packing member disposed at the juncture between the sleeve and rotary member, said packing member being thrown outwardly against the stationary sleeve by centrifugal force to provide a substantially fume tight joint therebetween.

6. In an electric motor and dynamo machine including a rotor and a stator, a member connected with the stator and extended thereover and having an annular trough at its outer periphery, a fluted member rotatable with the rotor and with the stationary member protecting the live parts of the machine from extraneous matter in the surrounding atmosphere, the flutes of said member forming internal and external surface irregularities to provide relatively large internal and external cooling areas, and an annular flange carried by the fluted member cooperating with the annular trough to form a trap and extended over the trough of the stationary member to guide matter passed over the periphery of the fluted member past the trap of the stationary member.

7. In an electric motor and dynamo machine including a rotor and a stator, a stationary member having an annular trough in its outer face portion, an imperforate fluted member, the flutes of said member forming internal and external surface irregularities to provide relatively large internal and external cooling areas, and a peripheral flange carried by the fluted member cooperating with the annular trough and having a part of a diameter greater than the largest diameter of said trough whereby the fluted member with the stationary member substantially encloses the live parts of the machine and extraneous matter is positively guided past the annular trough.

8. In an electric motor and dynamo machine including a rotor and a stator having windings, the ends of which project beyond the rotor, a stationary sleeve extended over the ends of the windings and having an annular trap at its outer periphery and concentric with respect to the rotor, a fluted member rotatable with the rotor, the flutes of said member forming internal and external surface irregularities to provide relatively large internal and external cooling areas, and an annular flange carried by the fluted member and projected over the annular trap of the stationary sleeve whereby said sleeve and rotatable member substantially enclose the live parts of the machine to protect the same from extraneous matter in the surrounding atmosphere.

In testimony whereof I have hereunto affixed my signature.

CARL LIVINGSTON DAUN.